United States Patent
Malhi

Patent Number: 5,812,116
Date of Patent: Sep. 22, 1998

[54] LOW PROFILE KEYBOARD

[75] Inventor: Satwinder D. S. Malhi, Garland, Tex.

[73] Assignee: Texas Instruments Incorporated, Dallas, Tex.

[21] Appl. No.: 657,703

[22] Filed: May 30, 1996

[51] Int. Cl.$^6$ .................................................. G09G 5/00
[52] U.S. Cl. ........................... 345/168; 345/156; 345/169; 341/20; 341/22; 400/490; 400/491.1
[58] Field of Search ..................................... 345/156, 168, 345/169; 341/22, 20; 200/517, 512, 5 A; 400/490, 491, 491.1, 491.2

[56] References Cited

U.S. PATENT DOCUMENTS

| | | | |
|---|---|---|---|
| 3,707,609 | 12/1972 | Dapot et al. | 200/5 R |
| 5,215,187 | 6/1993 | Ping-Chieng et al. | 200/517 |
| 5,386,091 | 1/1995 | Clancy | 200/517 |
| 5,399,824 | 3/1995 | Chen | 200/534 |
| 5,438,177 | 8/1995 | Fagan | 200/517 |
| 5,534,891 | 7/1996 | Takano | 345/169 |
| 5,684,279 | 11/1997 | Burgett | 200/5 A |

*Primary Examiner*—Jeffery A. Hofsass
*Assistant Examiner*—Julie Lieu
*Attorney, Agent, or Firm*—Bret J. Petersen; James C. Kesterson; Richard L. Donalson

[57] ABSTRACT

A low profile and light weight keyboard for portable electronic devices, such as notebook computers. In specific embodiments, the present invention provides a low profile keyboard 218 where the keycap engaging members 202 extend unobstructed below the back plate or circuit board 204. The travel of the key below the back plate may be eliminated from the overall stowed keyboard thickness by popping up the keyboard or otherwise extending the keyboard to a deployed position having sufficient thickness to accommodate the travel of the engaging members 212 below the base 204.

15 Claims, 3 Drawing Sheets

LOW PROFILE KEYBOARD

CROSS-REFERENCE TO RELATED APPLICATIONS

The following coassigned patent applications are incorporated herein by reference:

| Number | Filing Date | Title |
| --- | --- | --- |
| 08/594,547 | 01/31/96 | Reduced Layer Keyboard |
| 08/627,258 | 04/03/96 | A Low Profile, Lightweight Keyboard |

FIELD OF THE INVENTION

This invention relates to keyboards and keyswitches, and more particularly, to a low profile keyboard which may be used in portable electronic devices such as laptops, notebooks, subnotebooks and pen computers, and other electronic machines that require keyboards.

BACKGROUND OF THE INVENTION

Keyboards or keyswitches are found on nearly every electronic device. Of particular interest herein are keyboards on portable electronic devices such as portable personal computers. Portable personal computers have developed from early luggable "suit case" designs, through the smaller "laptop" design, and now, with the aid of increasingly smaller packaging to "notebook," "sub-notebook" and personal digital assistants (PDAs) such as pen computers.

A "notebook" personal computer is about the size of a conventional loose leaf binder holding letter size paper, and typically weighs about 4–8 pounds. PDAs typically are too small to incorporate a keyboard and therefore often use a pen as the main interface for input. PDAs may weigh less than one pound to about 3 pounds with a screen size of about 5 by 7 inches or smaller. Those portable computers having size, weight and performance lying between the notebook and PDA are typically referred to as subnotebooks. In almost all portable notebook computer models, a keyboard compartment is hinged to a display screen compartment in such a manner that it is possible to fold the display screen compartment down against the keyboard compartment and to latch the two together. PDAs typically are a single enclosure with a screen on the top surface.

A significant portion of the thickness and weight of notebook and subnotebook computers is the keyboard. Low profile switches are sought to reduce the height and weight of keyboards in portable personal computers. Additionally, it is important to users that the keyboard allow typing at a high speed. Two factors are very important to most users: (1) the depth of a keystroke and (2) the feel of the key including the tactile response once the keystroke is complete.

Making keyboards thinner has often involved reducing the depth of the keystroke. Reducing the depth of the keystroke under three millimeters, however, is unacceptable to many users. A keystroke of four millimeters is favored by most users, particularly touch typists, because it is similar in feel to a desktop computer keyboard. Accordingly, notebook computers which reduce height by reducing the depth of a keystroke are likely to be disfavored by many touch typists.

In a coassigned application listed above, U.S. Pat. application No. 08/594,547, a low profile keyboard was disclosed which has a reduced number of layers for implementing a keyboard. Weight and thickness of the keyboard are reduced by having a base with mounts for engaging the key caps rather than the key caps engaging a front plate common to prior art designs.

SUMMARY OF THE INVENTION

This invention provides a lighter and thinner keyboard without sacrificing the functionality for portable electronic devices, such as notebook computers. In specific embodiments, the present invention provides laptops, notebooks and sub-notebooks with a low profile keyboard which can be deployed from a storage position and once deployed have the feel and travel of prior art keyboards while retaining conventional type wobble control. The invention solves the problem of the double thickness needed for wobble control and key retainers in prior art designs by using the circuit board or a bottom plate for catching the cap retainers, and having the retainers extend below the keyboard when depressed. In addition, the keyboard may be popped up to a deployed position so the space for moving the retainers does not contribute to the overall size of the keyboard.

In an embodiment of the invention, a low profile keyboard keyswitch is described which has a key cap having engaging members which extend essentially perpendicularly from the key cap top surface. The engaging members have means for locking the engaging members into a base. The base may be a printed circuit board or a rigid material with a flexible printed circuit. The base layer has holes positioned for slidably retaining the engaging members as the key is depressed by the user. The printed circuit board has electrical traces for generating an electrical signal in response to a keystroke by the user.

In another embodiment, a low profile keyboard keyswitch is described which has a key cap having a centrally located single piston for anti-wobble which extends perpendicularly from the key cap top surface. The base layer has holes positioned for slidably retaining the piston as the key is depressed by the user.

An advantage of the present invention is the space needed to allow the key to travel both above and below the front plate of prior art designs is reduced by essentially one half. The travel of the keyswitch engaging members is now below the base where it is unobstructed. When such as keycap is combined with a deploying enclosure, this additional space may be eliminated from the overall keyboard thickness when the keyboard is in the stowed position. Therefore, using the present invention it would be possible to make a key having a travel of 3 mm while having a stowed thickness of about 6 mm or less.

Another advantage of the present invention is the keyboard keys have more travel for a better tactile feedback over low profile prior art designs by eliminating the double thickness of the key travel in the overall stowed thickness.

The present invention also advantageously combines light and low profile keys with traditional wobble control methods to provide a low cost, low profile keyboard with improved user feel and tactile feedback over prior art designs.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

The preferred embodiments of the present invention are best understood by referring to FIGS. 1–9 of the drawings, like numerals being used for like and corresponding parts of the various drawings.

Figure 1:
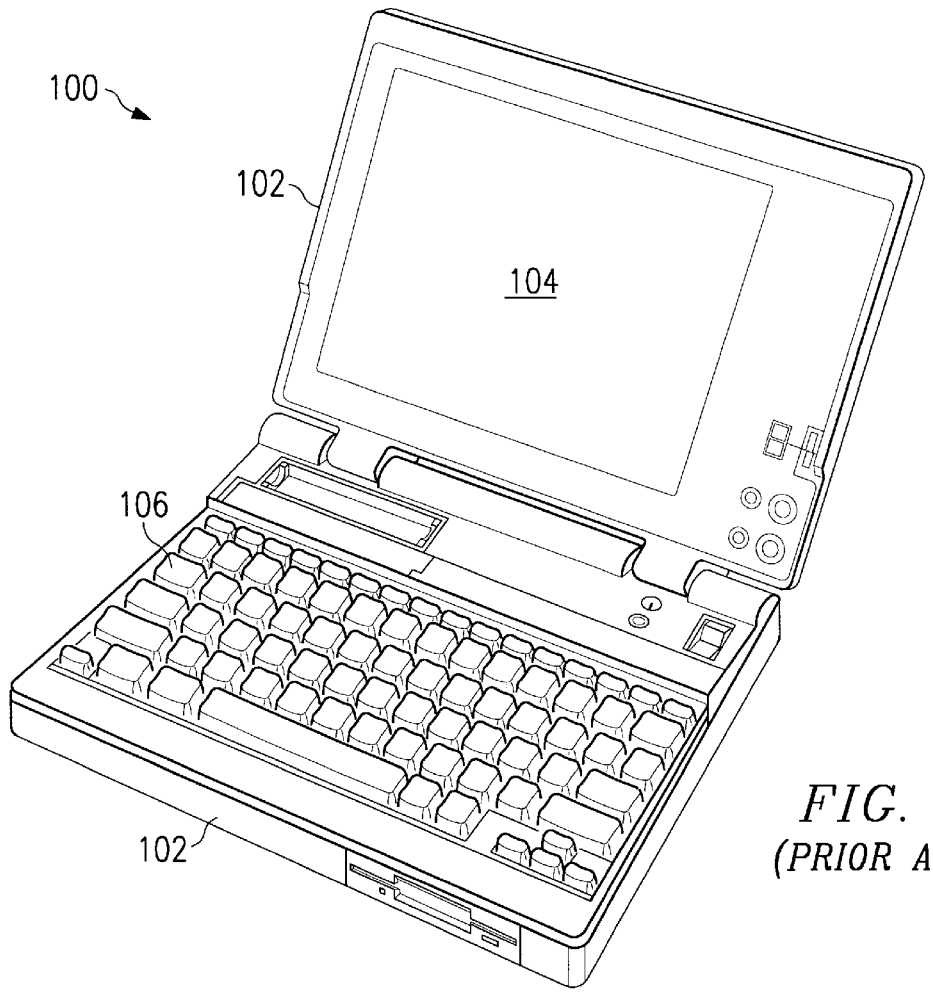
FIG. 1 Represents a typical notebook computer of the prior art.

With reference to FIG. 1, there is shown a prior art portable computer 100 of the type commonly referred to as a notebook computer, or laptop computer. Computer 100 includes a housing 102 which is a clamshell type enclosure which includes a top and bottom housing. The top housing includes a screen 104, and the bottom housing has a keyboard 106. The two housings are connected along one edge with a hinge for pivotal movement relative to each other to expose the keyboard and display for use from the closed position. In order to reduce the overall thickness of the combined housings it is desirable to reduce the thickness of the keyboard and its associated housing.

Figure 2:
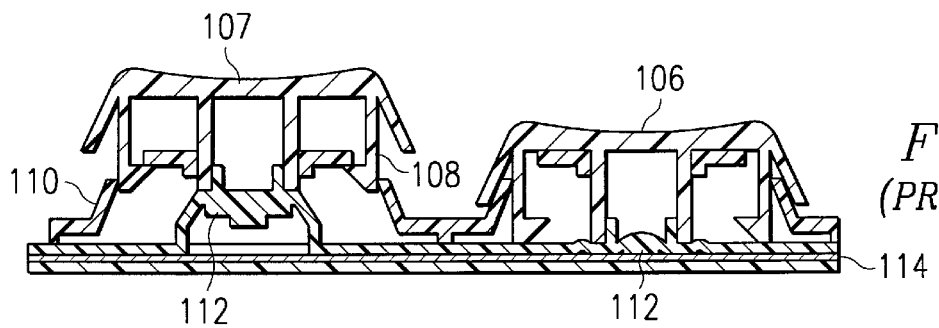
FIG. 2 Represents a cross-sectional view of two adjacent keyboard keys of the prior art.

An example of a prior art keyboard key is illustrated in FIG. 2 which represents a cross sections of two keys. In this type of key, a keycap 107 has retainers 108 to engage a front plate 110. When the key is depressed, as shown in the right portion of FIG. 2, contacts on a flexible dome 112 make contact with electrical traces on a circuit board 114. This design suffers from the additional weight needed for the front plate 110 and the thickness of the key includes space for the key travel both above and below the front plate. Therefore it would be difficult to make a key having a travel of 3 mm less than about 9 mm thick using this type of key design.

Figure 3:
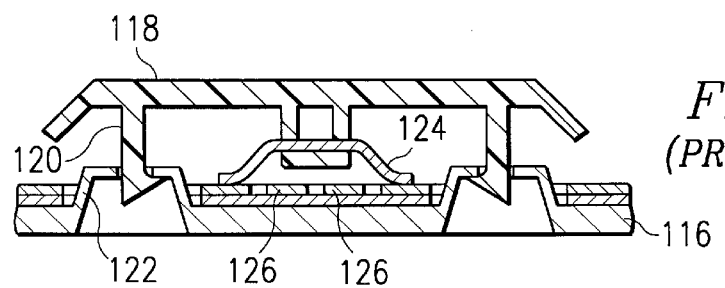
FIG. 3 Represents a cross-sectional view of two adjacent keyboard keys of the prior art according to the referenced co-assigned application.

A second prior art keyboard key from the above referenced, co-assigned application is illustrated in FIG. 3. The front plate in this design has been eliminated by incorporating the retaining means previously in the front plate into the back plate 116. The keycap 118 has retainers 120 which engage to protrusions in the bottom plate 122. Similar to prior art designs, the keycap 118 presses a contact on a flexible cone 124 to make contact between circuit board traces 126. While this design reduced the weight over prior art key designs, it did not significantly reduce the thickness. This key still requires a key thickness that includes space for key travel both above and below the plate used for retaining the key cap.

Figure 4:
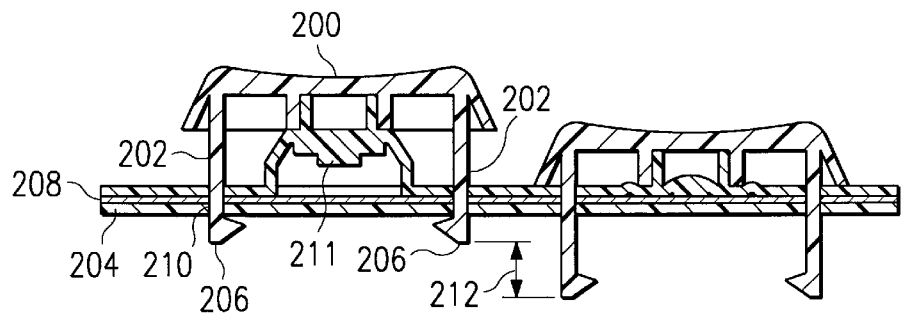
FIG. 4 Represents a cross-sectional view of two adjacent keyboard keys of a preferred embodiment of the present invention.

An embodiment of the present invention is illustrated in FIG. 4 which represents a cross sections of two keys. This embodiment includes a low profile keyboard keyswitch which has a key cap 200 having engaging members 202 which extend essentially perpendicularly from the key cap top surface. The engaging members 202 have means for locking the engaging members into a base 204 such as the hook type projections 206 shown in FIG. 4. The base 204 may be a printed circuit board or a rigid material with a flexible printed circuit 208 attached as shown. The base has holes or openings 210 positioned for slidably retaining the engaging members as the key is depressed by the user. The key may have a flexible dome 211 as used in prior art structures for providing a conductive contact and key return. The printed circuit board 208 has electrical traces for generating an electrical signal in response to a keystroke by the user as is well known in the prior art. When engaging members without locking means are used, the engaging members serve the same purpose as anti-wobble pistons or plungers. In this embodiment, the keycap with non-locking engaging members could be bonded to the flexible dome layer and rely on the bond or other means to remain in position.

The keys according to the present invention not only eliminate the additional weight needed for the front plate of prior art designs, but also has the potential to eliminate the space needed to allow the key to travel both above and below the front plate of prior art designs. Advantageously, the travel of the keyswitch engaging members is now below the base where it is unobstructed. When such a keycap is combined with an enclosure as described below, the space used by the engaging members during actuation 212 may be eliminated from the overall keyboard thickness when the keyboard is in the stowed position. Therefore, using the present invention it would be possible to make a. key having a travel of 3 mm while having a stowed thickness of about 6 mm or less.

Figure 5:
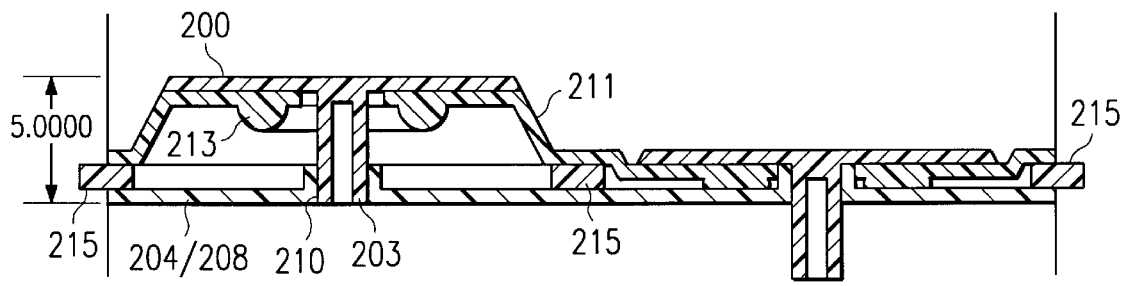
FIG. 5 Represents a cross-sectional view of two adjacent keyboard keys of a preferred embodiment of the present invention.

Another embodiment of the present invention is illustrated in FIG. 5 which represents a cross sections of two keys. This embodiment includes a low profile keyboard keyswitch which has a key cap 200 having a centrally located piston 203 which extends essentially perpendicular from the key cap top surface. The piston 203 may have retention means for retaining the piston 203 with the base 204 or may be bonded to the flexible dome 211 as shown in FIG. 5. The base 204 may be a printed circuit board or a rigid material with a flexible printed circuit. The base has holes or openings 210 positioned for slidably retaining the key piston as the key is depressed by the user. The key has a flexible dome 211 as used in prior art structures for providing a conductive contact 213 and key return. The printed circuit board 208 has electrical traces for generating an electrical signal in response to a keystroke by the user as is well known in the prior art. The keyboard may also include a rib structure 215 for spacing the flexible layer or flexible domes 211 above the base 204. The rib structure may be a separate layer or integrally formed with the base.

Figure 6:
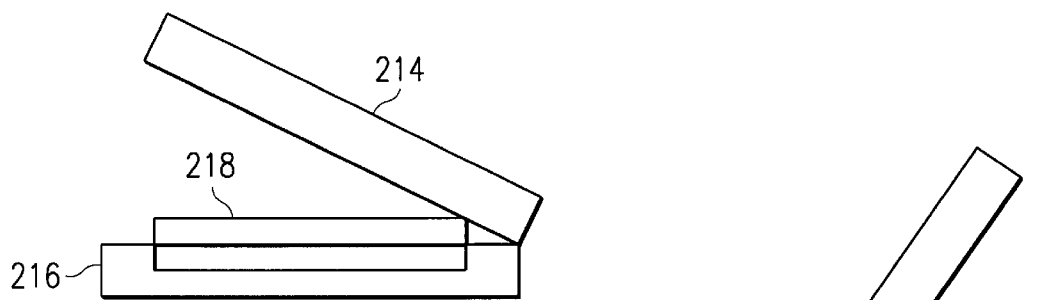
FIG. 6 Represents a side view of a notebook computer of the present invention.

An additional embodiment of the present invention is a keyboard which "pops-up" to a deployed position to allow clearance for said engaging members when deployed but does not allow clearance for said engaging members when not deployed. An illustration of such a keyboard is shown in FIG. 6. This embodiment is a typical clam shell type arrangement where a display enclosure 214 is hinged to a keyboard enclosure 216. The keyboard 218 moves to the shown deployed position after the display and keyboard enclosures are opened up, or the deployment may be automatically initiated by the opening of the enclosures by some mechanical or electrical means.

Figure 7A:
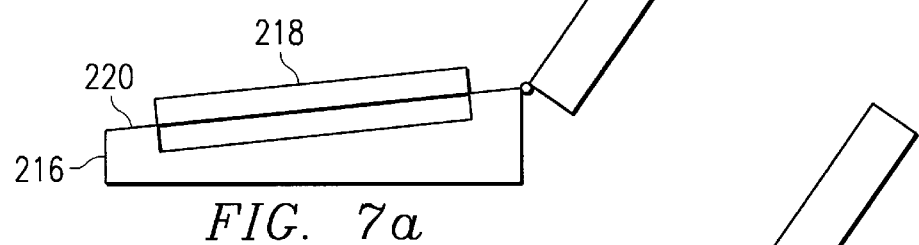
FIG. 7 Represents a side view of a preferred embodiment of the present invention where the keyboard is on an inclined plane.
Figure 7B:
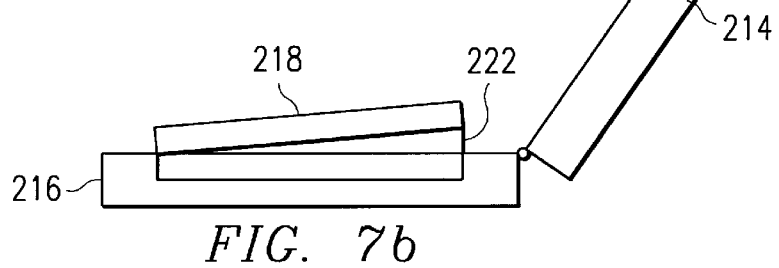

Other embodiments of the present invention are shown in FIG. 7a and 7b. In these embodiments the keyboard "pops-up" to a deployed position which is in an inclined plane. In FIG. 7a the keyboard 218 pops-up from a housing 216 which has an inclined face 220 as shown. Similarly, in FIG. 7b, keyboard 218 pops-up from a housing 216 at an incline. In this example, the incline may be provided by the rear keyboard support 222 extending upwards further than the front keyboard support.

Figure 8A:
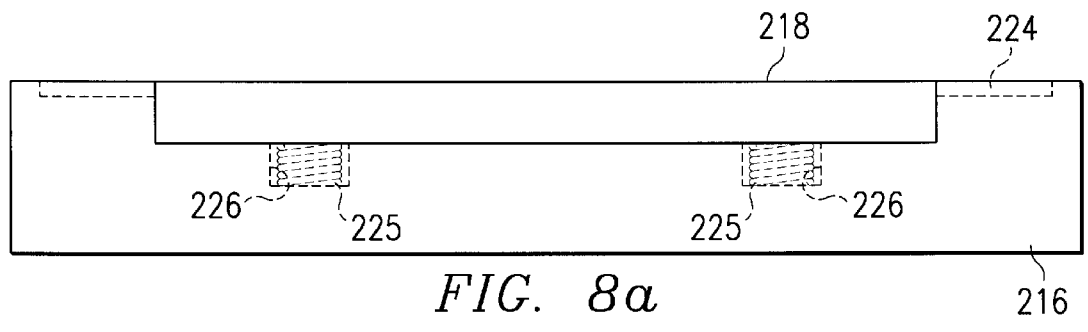
FIG. 8 Represents a side view of an embodiment notebook computer showing a mechanism to support the keyboard in the deployed position.
Figure 8B:
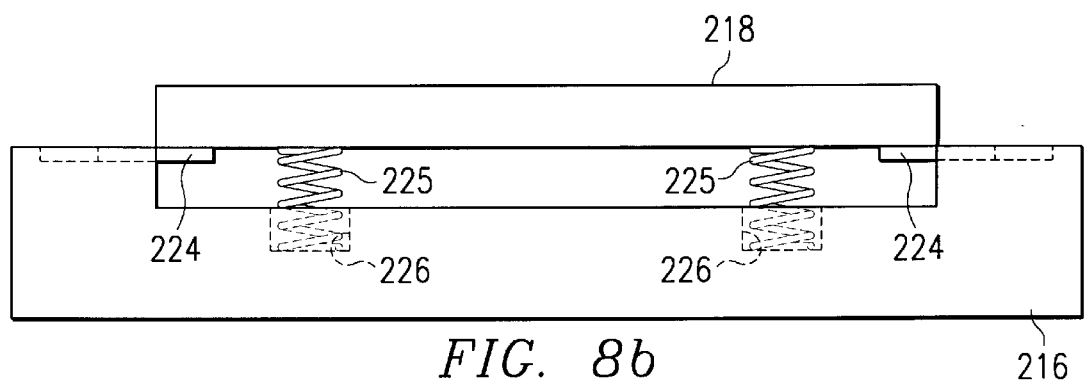

FIGS. 8a–b illustrate a structure for implementing the pop-up keyboard discussed above. FIG. 8a shows a keyboard 218 is a stowed position in housing 216. The housing 216 includes retainers 224 which may be springably attached to the housing. When the keyboard 218 is deployed as shown in FIG. 8b, retainers 224 engage the keyboard 218 to hold the keyboard in the deployed position. The retainers may include tabs or other means for the user to retract the stops to allow the keyboard to be returned to the stowed position. The keyboard 218 may include springs 225 for "popping-up" the keyboard into the deployed position, illustrated in FIG. 8b. Springs 225 when compressed fit in a recessed area 226 of the housing as shown in FIG. 8a.

Figure 9A:
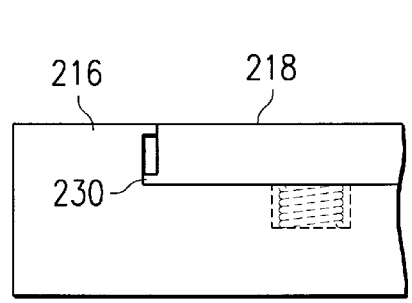
FIG. 9a–c Represents views of an embodiment notebook computer showing a mechanism to guide and stop the keyboard in the deployed position.
Figure 9B:
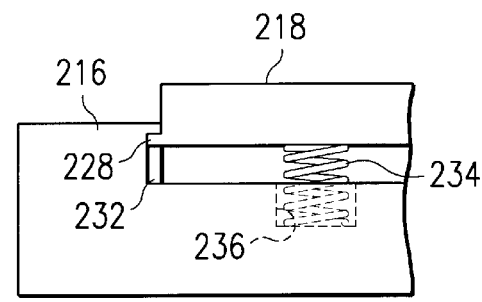
Figure 9C:
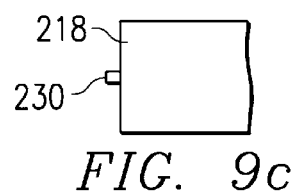

The keyboard also may include one or more means for guiding the deployment of the keyboard and retaining the keyboard to the housing in the deployed position. FIGS. 9a–c illustrate an embodiment for a guiding means. In this embodiment, one or more guide pins 230 move in guide slots 232 of housing 216 to allow the keyboard 218 to move up to the deployed position. The guide pins 230 may act as a final stop for the keyboard and also hold the keyboard in lateral position. FIG. 9c shows a top view of guide pin 230 on keyboard 230. The guide pins 230 fit snugly in guide slots 232 to provide lateral confinement.

Electrical connection to the keyboard from the computer electronics, typically located in the lower housing, may be accomplished by a flexible circuit 234 connected to the housing 216 in a recess 236 as shown in FIG. 9b. When the keyboard is stored, the flexible circuit 234 folds into the recess 236. Alternatively, the keyboard connection could use infrared or optical techniques.

It will be apparent to one skilled in the art that there are many variations that could be used for extending the keyboard into the deployed position. Similarly, the key cell can be designed with different types of cone and alignment pin arrangements which are known by those skilled in the art and are contemplated by the present invention.

What is claimed is:

1. A portable electronic device comprising:
   a. a housing;
   b. a low profile keyboard associated with said housing comprising:
      i) a plurality of key caps having engaging members;
      ii) a base layer having openings for slidably guiding said engaging members wherein said engaging members extend below said base a travel distance when pressed by a user of said keyboard; and
      iii) electrical traces associated with said base layer for generating an electrical signal in response to a keystroke by the user;
      iv) a deployed position and a stowed position for said keyboard in said housing:
      wherein said low profile keyboard provides clearance below said base for said engaging members travel distance when said keys are pressed in the deployed position but does not allow clearance for said engaging members travel distance when said keyboard is in the stowed position.

2. The electronic device of claim 1, wherein said electrical traces are on a flexible circuit layer above said base layer.

3. The electronic device of claim 1, wherein said base layer is a printed circuit board and said electrical traces are on said printed circuit board.

4. The electronic device of claim 1, wherein said engaging members have means for locking the engaging members in the base.

5. The electronic device of claim 1, wherein said keyboard further comprises a flexible layer having flexible cones having conductive material to contact said electrical traces when compressed by said keys.

6. The electronic device of claim 1, wherein said keyboard further comprises means for automatic deployment to allow the keyboard to pop-up automatically.

7. The electronic device of claim 1, wherein said base is essentially planer.

8. The electronic device of claim 1, wherein said keyboard pops-up from an inclined top housing surface relative to the bottom of the housing to provide a comfortable typing position for the user.

9. The electronic device of claim 8, wherein said keyboard pops-up to an incline position from a non-inclined, non-deployed position.

10. The electronic device of claim 1, wherein said key engaging members are singular centrally located pistons for each key.

11. The electronic device of claim 1, wherein said key engaging members are two or more engaging members per key located outside at the periphery of said key.

12. The keyboard of claim 1, wherein said keyboard pops-up to an incline relative to the bottom of the housing to provide a comfortable typing position for the user.

13. The keyboard of claim 2, wherein said keyboard pops-up to an incline position from a non-inclined, non-deployed position.

14. A portable electronic device comprising:
   a. a housing;
   b. a low profile keyboard associated with said housing comprising:
      i) a plurality of key caps having engaging members located at the periphery of said key;
      ii) flexible cones having conductive material;
      iii) electrical traces associated with said base layer for generating an electrical signal in response to a keystroke by the user which brings said conductive material of said flexible cones in contact with said electrical traces;
      iv) a base layer having openings for slidably retaining said engaging members; and wherein said engaging members extend below said base a travel distance when pressed by a user of said keyboard; and
      v) a deployed position and a stowed position for said keyboard in said housing; wherein said low profile keyboard provides clearance below said base for said engaging members travel distance when said keys are pressed in the deployed position but does not allow clearance for said engaging members travel distance when said keyboard is in the stowed position.

15. The electronic device of claim 14, wherein said engaging members have means for locking the engaging members in the base.

* * * * *